United States Patent [19]

Samon

[11] Patent Number: 5,132,714
[45] Date of Patent: Jul. 21, 1992

[54] PORTRAIT CAMERA WITH AURA RECORDING MEANS

[76] Inventor: Scott W. Samon, 2838 Seminary Ave., Oakland, Calif. 94605

[21] Appl. No.: 577,288

[22] Filed: Sep. 4, 1990

[51] Int. Cl.⁵ .............................................. G03B 29/00
[52] U.S. Cl. ......................................... 354/3; 358/909
[58] Field of Search ............................. 354/3; 358/909

[56] References Cited

U.S. PATENT DOCUMENTS 4,222,658  9/1980  Mandel ................................ 354/3 X
4,386,834  7/1983  Toolan ..................................... 354/3

*Primary Examiner*—Michael L. Gellner

[57] ABSTRACT

A portrait camera with aura generating means for creating a photographic recording of a portrait subject and a visible aura image, the subject image received through a front lens of the camera and the aura image received from a projector controlled by a microprocessor system which receives input from circuits connected to the hand over a period of time and sends a pattern to a projector within the camera.

8 Claims, 3 Drawing Sheets

PORTRAIT CAMERA WITH AURA RECORDING MEANS

BACKGROUND OF THE INVENTION

This invention relates to a portrait camera with an aura recording means that records the image of a person together with an image an aura on photographic film. More specifically, this invention relates to a photographic camera consisting of a camera with internal aura generating projector, a tactile electrode array, and a microprocessor system with input circuits, data base and output driver circuits. The aura pattern is selected from the electrical response of selected points on the hand over a period of time and a computer algorithm and data base to select and project an aura image onto the film together with the image of the portrait subject received through the front lens of the camera.

Cameras are now a standard means for recording the image of a person on a film plate. Photographic cameras typically contain a single lens and shutter placed at a distance such that the image of a person external to the camera is in focus on a film plane. Photographic films typically record the visible spectrum of light and thus only visible images. Conventional cameras and films are not specifically designed to record the aura image of a person together with the visible image of the person. A problem with existing cameras and film is that they are limited in the frequency range of radiation that can be recorded. Films designed for recording the optical image of a person with greatest fidelity operate only over a narrow range of the frequency spectrum. This limitation prevents conventional cameras from recording the aura of a person.

It is an objective of the present invention to include in a camera a means for recording the aura of a person simultaneously with the image of the aura of a person. One approach is to create a visible image of the aura with an array of lights and to project this image onto the photographic film together with the image of the portrait subject, to develop a data base of aura images created from testing many persons with an electrical circuit, and using a microprocessor system to measure the response of a person, select an aura image and produce a visible image on film with a light generating projector.

It is further an objective of the invention to include in a camera a means to determine the distribution of the aura around a person as measured by the response of different parts of the hand with an electrical circuit over a time period.

A multiple image photographyt system was disclosed by R. Beer in U.S. Pat. No. 4,681,415. This system includes a camera, a computer and a pair of mirrors that are moved to different positions to generate multiple positionally displaced images onto photographic film. This improvement is not useful to an aura camera because the images so produced are only the images of a subject and they are all identical.

A color television camera having a test pattern projected through a non-incident prism plane was disclosed by M. Toyama, T. Ebihara, S. Kawai and N. Shimoda in U.S. Pat. No. 4,823,187. This patent describes a camera containing an internal projector which projects a test pattern onto a beam splitter that sends different colors to three television cameras for the purpose of calibrating intensity of the light received by the three television cameras. The test pattern in the above invention is created by a single filament and therefore does not provide a controllably variable image that can be combined with the image of a person.

An electronic recording camera with front projector was disclosed by J. J. Larish in U.S. Pat. No. 4,835,563. This camera contains a beam splitter and a built-in front projector that projects a background image onto the subject, a beam splitter allowing concurrent recording of the portrait subject by photographic film and by a video camera, the latter image stored and retrieved with a computer. The built-in front projector in the above invention is undesirable in an aura camera because the light from the projector will fall upon the subject and thereby contaminate the light received from the subject by the film. The video processor is not needed in an aura camera. Therefore, the improvements incorporated in the above invention are not useful in an aura camera.

An approach for measuring the response of a transducer to a person is described in U.S. Pat. No. 4,557,269. This patent relates to a transducer apparatus for use in an electromanomometry system. This apparatus contains a plurality of sensors in the form of resistors connected to a piezoresistive strain gauge in the form of a resistive bridge network. This network responds to a property of a person, namely the changes in themodynamic pressure. The sensors are electrically isolated from the person by means of a nonconducting gel. This patent teaches that a property of a person can be sensed by a non-invasive transducer applied to the exterior of a person, said transducer connected to an electrical network which responds to the desired property. The gel electrode is undersirable in portrait photography where the gel can cause discomfort to the portrait subject.

A method and apparatus for measuring the electrical potentials of a woman during ovulation is described by K. P. Stoller in U.S. Pat. No. 4,557,273. Measurement of high impedence electrical potential of the finger-tip is accomplished by means of a non-invasive array of electrodes, connected to d.c. amnplifiers, applied to the finger-tip to locate the site of maximum d.c. potential in relation to an electrode on the palm of the hand. By measurements of the potential on the finger-tip taken at intervals over many days, the time of maximum probability for ovulation is determined. This method is not useful to a portrait photographing because it requires too much time.

One approach for providing a aura of a person is provided by D. L. Motoyama who is conducting research in Tokyo on bioluminescence produced by skin cells by cell metabolism. This approach requires measurement of the bioluminescence over the surface of the skin of a person. Such an approach is not useful in a portrait camera where only the skin of the face is visible.

A relationship between the hand or foot of a person and the energy and nervous system is provided by the subject of reflexology, as described for example by M. Segal in "Reflexology" published by Wilshire Book Co., Hollywood, CA, 1976. Reflexology is a natural art of healing originating in China, and utilizing the relationship between parts of the foot or hand to the energy and nervous system of parts of the body. This refrence teaches that when the hand is measured, it is important to sense selected points on the palm as well as the fingers. In the art of reflexology, the energy and emotion of parts of the body can be sensed by their response on specific parts of the hand. Thus it would be possible to us an array of sensors on the hand to monitor the distribution of energy and emotion, and thus the aura, of a person.

A further method and apparatus for detecting body dysfunction or pathology by means of a digital neurometer instrument is described by K. P. Stoller in U.S. Pat. No. 4,557,271. In this method, an array of sensors measure the bolateral dermal potential of different tips of the fingers or toes. This patent teaches that if the inner organs or system is functioning in an abnormal or diseased manner, then the d.c. bioelectrical potentials display a relatively high bilateral voltage variance, whereas if the inner organs or system is funtioning normally, the voltages approach each other. The person under test places a hand on a hand-plate containing multiple sensors which contact the tip of each finger. A digital micro-processor containes memory circuitry and interfaces with a visual display means and printer. This patent teaches that the neurological state and pathology of different parts of a person can be sensed with a plurality of electrodes applied to the tips of the fingers. This method is inconsistent with the teachings of reflexology which requires measurements of selected points of the palm as well as the fingers.

SUMMARY OF THE INVENTION

It is the general objective of the present invention to provide a novel portrait camera which records the image of a portrait subject combined with the aura image of the subject. To accomplish this, a multiple light source and and projector is placed within a camera with front lens and combined with a computer with electrical circuit input and optical drivers, said computer containing a data base of aura patterns selected from the input circuit and said projector sending a visible image to the film.

I have invented the aura camera which is is an apparatus to create on a film the image of a person with the image of an aura measured externally to the camera. My invention posesses the desirable and/or required features receited previously and other advantages readily apparent to the ordinary skilled artisan.

A visible aura image is created by a projector consisting of an optical array of lights, a diffuser, and a hologram which modify the optical image. The external sensors consist of an array of electrodes on which the hand is placed, and a group of electrical circuits which measure the electrode responne over a short time period. The sensor circuits were used to measure the responses of a large group of people. From these measurements a data base of aura patters was created. Thus the preferred embodiment of the aura camera includes a camera with an interior optical projector, an external sensor array, and a microprocessor system for recording the array signals and converting them into a desired image. A further preferred form of the invention is in the form of an easily portable system. A preferred form of the detachable parts is a box containing the electrodes and microprocessor system, and a camera unit.

DETAILED DESCRIPTION OF THE INVENTION

Before explaining the present invention in detail, it is to be understood that the invention is not limited in its application to the details of construction and arrangement of parts illustrated in the accompanying drawings, since the invention is capable of being formed in other embodiments and of being used in a variety of ways. Also, it is to be understood that the phraseology or terminology employed herein is only for the purpose of describing the invention, and other terms could be used as well. The invention will be more clearly illustrated by referrring to the FIGS.

Figure 1:
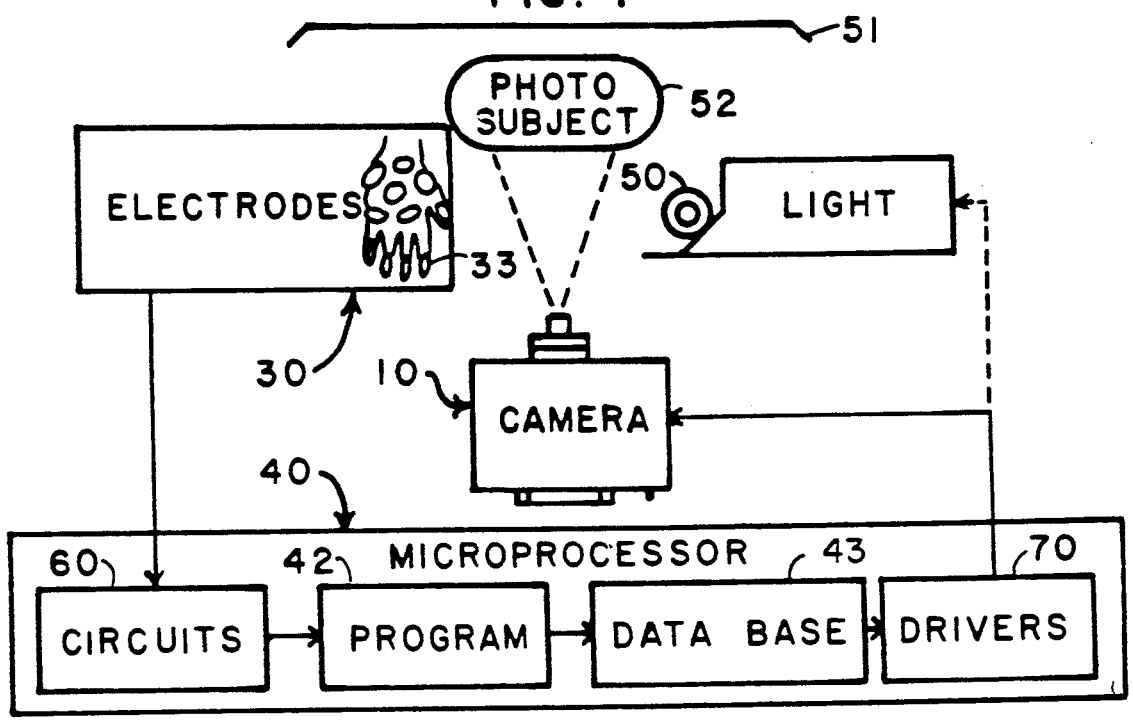
FIG. 1 shows a top view of the aura camera, controller with hand plate and studio lights in relation to the photo subject, together with a block diagrammatic presentation of the internal equipment components and their functions.

FIG. 1 shows a top view of the camera 10, together with a box supporting a hand plate of electrodes 33 and containing a microprocessor controller 40. The camera 10 is directed at a photo subject 52 illuminated by a light 50. A black photo backdrop 51 is placed behind the photo subject. Internal components are also shown in block diagrams. In operation, the photo subject places a hand on the electrodes 33. Circuits 60 measure the response. The microprocessor system 40 utilizes a program 42 and a data base 43 to send a pattern through drivers 44 to the projector 20, thereby creating an aura image on the film 16.

Figure 2:
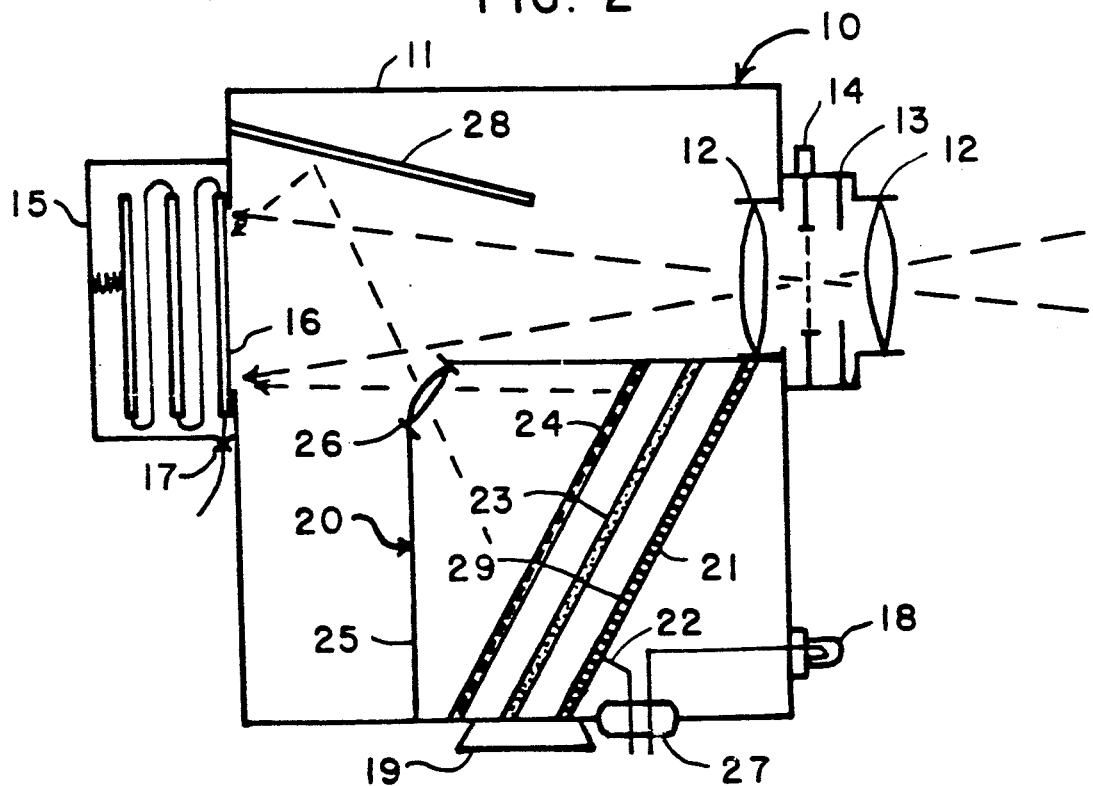
FIG. 2 shows a cross section view of the camera and internal projector.

FIG. 2 shows a detailed view of the camera. The camera 10 consists of a light-tight housing 11, compound lens 12, iris 13, and shutter 14. An image capture means can be film or a vidicon. A film housing 15 is shown containing several film elements such as Polaroid, and a spring for pressing one film 16 against an aperture in the camera. The film can be removed through port 17. An indicator light 18 is illuminated by means of driver input wire 22, entering the camera through connector 27. The camera is supported on a tripod by base 19.

A projector 20 is contained within the camera 10, consisting of an array of light generating elements 21 controlled by driver inputs 22, that illuminate through a diffuser 23 and hologram 24. The projector confines the light with a housing 25 and through a lens 26 to illuminate the film 16.

Figure 3:
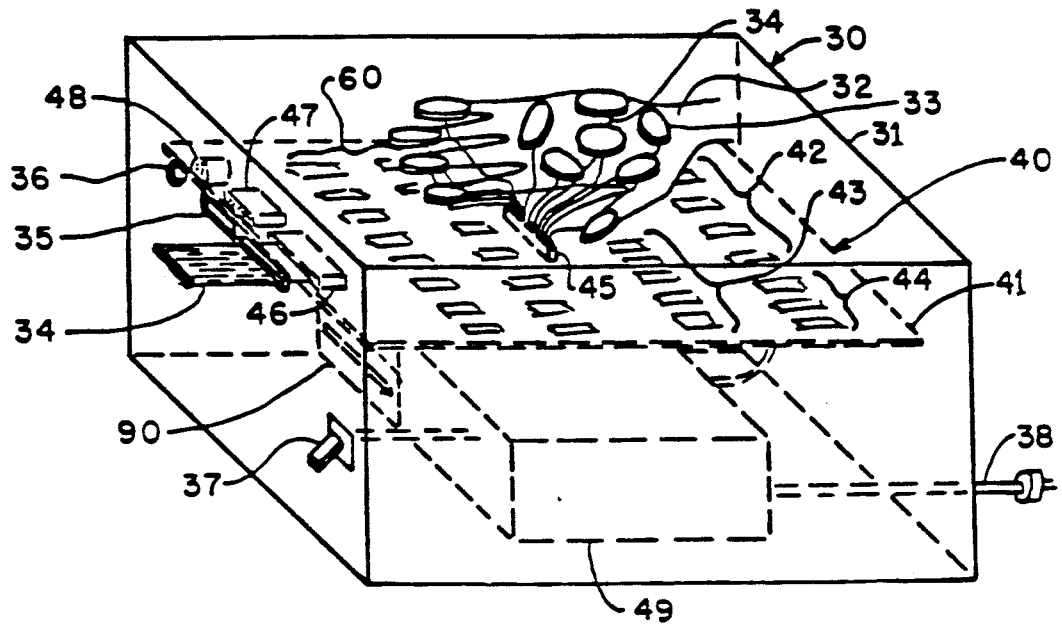
FIG. 3 shows the control box containing a microprocessor system.

FIG. 3 shows a detailed view of the control box 30 consisting of a container 31, a hand plate 32 of electrodes 33, an camera control cable 34. The box has ports for a monitor 35 and for a keyboard 36, and has a power switch 37 and power cable 38.

The microprocessor system 40 contained within the box 30 consists of one or more circuit boards 41 supporting memory components containing a program 42 and a data base 43, input circuits 49 and output driver circuits 60. The microprocessor system has connectors for electrode input 45, driver output 46, as well as monitor 47 and keyboard 48. Data can be stored in a mass data storage unit 90.

Figure 4:
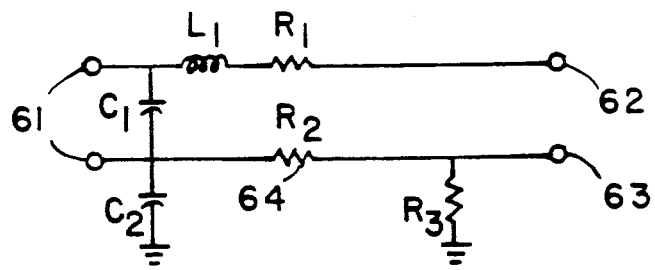
FIG. 4 shows an input circuit connected between an electrode in the hand plate and the microprocessor system.

FIG. 4 shows one form of an input circuit. Electrodes 33 are connected to contacts 61. Energy transferred through the components 64 from constant voltage input 62 cause the output 63 to increase toward a steady state value. The rate of change and the steady state value are typically different for different persons and conditions, when the component inductor L1 has a preferred value in the range from 10 to 200 microHenry, component resistors R1 and R2 have preferred values in the range from 1 Ohm to 10 kiloOhm, component resistor has a preferred value in the range from 0.1 to 10 MegOhm and component capacitors C1 and C2 have preferred values in the range from 0.1 to 100 picoFarads.

Figure 5:
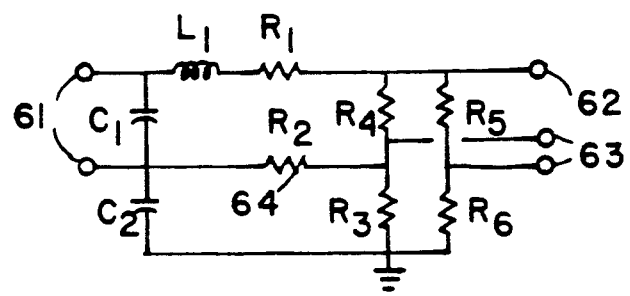
FIG. 5 shows a second input circuit for differential measurement connected between an electrode in the hand plate and the microprocessor system.

FIG. 5 shows an input circuit allowing differential input from electrodes 33 connected to contacts 61. Energy transferred through components 64 from constant voltage input 62 cause the output 63 to differ in magnitude, the the rate of change and the steady state value typically differing for different persons and conditions. Components have preferred values as in FIG. 4. In addition, components R4 and R5 have preferred values in the range from 10 to 100 kiloOhm, and R6 has a preferred value in the range from 0.1 to 10 MegOhm.

Figure 6:
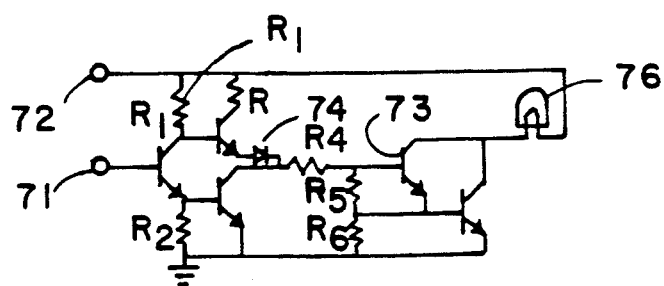
FIG. 6 shows the output circuit driving a light element in the projector.

FIG. 6 shows an output driver circuit 70 that sends power from a source 72 to a light generating element 21 in the projector 20 in response to digital output 71. The circuit uses transistors 73 and a diode 74 to increase the power supplied to high levels with the aid of control components 74. Components R1 through R6 have preferred values in the range from 2 to 8 kiloOhm.

Figure 7:
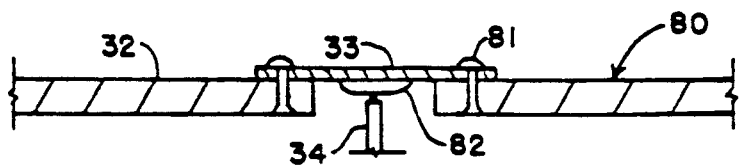
FIG. 7 shows a method of attaching an electrode to the hand plate with rivets.
Figure 8:
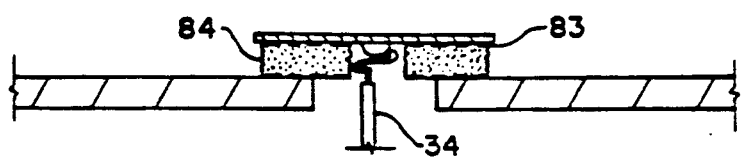
FIG. 8 shows a method of supporting an electrode above the hand plate with a foam layer.
Figure 9:
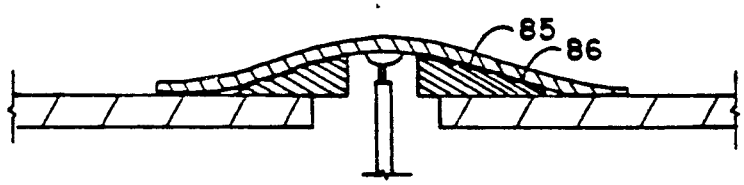
FIG. 9 shows a method of attaching an electrode with a raised profile to the hand plate.

FIGS. 7 through 9 show alternate ways the electrodes 33 are supported on the hand plate 32. The electode wire 34 is connected to the underside of the electrode 33 by solder 82. Rivets 81 are shown in FIG. 7, bonding tape 83 in FIG. 8 and glue 85 in FIG. 9. An electrode 33 is shown supported on a foam plate 84 in FIG. 8 and on a raised solid support 86 in FIG. 9. Raised electrodes are considered important to make contact with certain portions of the hand.

Figure 10:
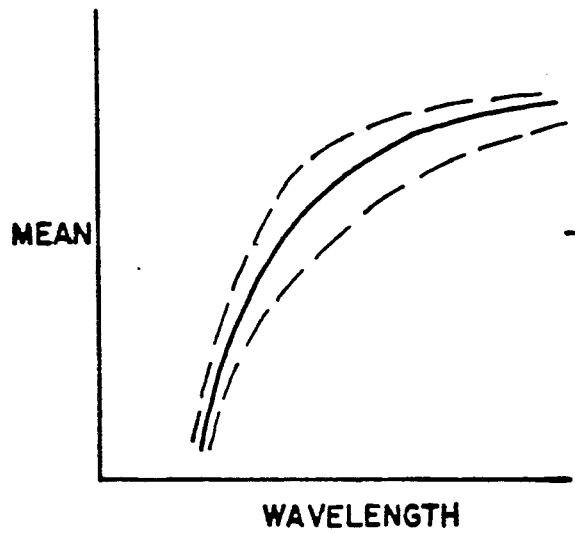
FIG. 10 shows the relation between the mean input from circuits versus the wavelength of the aura.
Figure 11:
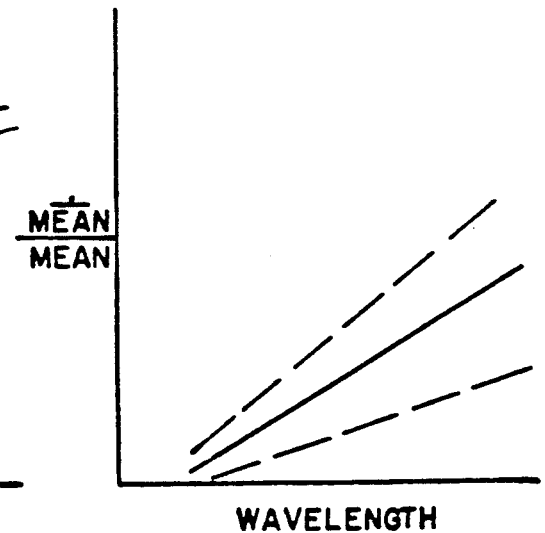
FIG. 11 shows the relation between the time rate of change of the mean of circuit inputs normalized to the mean of circuit inputs versus the wavelength of the aura.

FIGS. 10 and 11 show data taken with the input circuits 60. The tests conducted are described in detail below.

FIG. 12 illustrates the computer program used to control the camera. This program is written in the BASIC language. In it, arrays are defined for the input data, the input data is acquired over a short time, the data is analized for the mean, time rate of change and distribution, and a pattern is selected and sent to the camera.

FIG. 13 illustrates an output driver program. It is written in the C language. It communicates the selected pattern through drivers to the light generating means in the projector over the required period of time for correct exposure.

I have made prototype Aura Cameras and tested them. In one embodiment I used a series of switches to set and generate the optical pattern in the projector. In another embodiment I used the microprocessor system described above to measure signals from the hand plate, select the optical pattern from a data base and drive optical elements in the projector.

I constructed electrodes for the hand plate from gold, aluminum, copper, tin, zink, steel, brass, and thin layers of these metals and their alloys on metal supports. The aluminum proved difficult to connect to electrical wires. The brass and iron tended to soil rapidly. The gold, tin, zink and copper electrodes and some of their alloys were effective, but required regular cleaning. Accordingly, The preferred material for the hand plate are gold, tin, zink and copper, and their alloys.

I tested the input circuits at the Institute for Psychic Development to determine the auras associated with the response of a test subjects. Two types of test circuits were connected to nine electrodes on a hand-shaped insulating plate. Test subjects placed their hand on the plate, and the responses measured over time. As the tests were performed, trained clairvoyants from the Institute for Psychic Development who claimed to be able to see auras, identified the color of auras of the persons under test. In one test I connected high frequency oscillators to the test electrodes, the frequency of which was changed by dermal contact. The results are shown in FIG. 10 and FIG. 11. In another tests, trained subjects placed themselves in emotional states to display specific aura colors. When their responses were measured, similar results to those shown in FIG. 10 and FIG. 11 were obtained.

FIG. 10 shows the mean of the outputs from all circuits of one kind after a specific time delay, plotted versus wavelength of the reported aura. The mean value increases approximately monatonically with wavelength.

FIG. 11 shows the time rate of change of the mean, normalized to the mean of outputs from all circuits of one kind after a specific time delay, plotted versus wavelength of the reported aura. This relationship increases approximately monatonically with wavelength.

Thus, the Aura Camera can be an effective means for recording the aura energy distribution of a person and recording it in the visible range.

I constructed several forms of the projector in the camera to achieve the desired effect. The preferred thickness of the glass diffuser plate was between 0.125 and 0.25 inch. The preferred holograms creates radial chromatic dispersion. In one design, I fitted the projector with a mirror to deflect the light from the projector onto film. In another design the mirror was movable to remove it from the light path between the camera lens to the film.

The invention has been described with reference to particular embodiments and methods of manufacturing them. However, it should be understood that modifications which would be obvious to the ordinary skilled artisan are contemplated to be within the scope of the invention.

What I claim is:

1. An portrait camera with aura recording means, said camera comprising:
   (a) a camera including a camera body, a front lens means for receiving image-forming light from a portrait subject, a shutter means adjacent to said front lens means, an image recording means in the back of the camera body, and a manual or automatic means for operating the camera,
   (b) a projector means within the camera body for projecting a multi-color image of an aura onto the image recording means in the region adjacent to the image of the portrait subject's head and body, said projector including a multi-color light generating means and focusing lens;

(c) an input circuit consisting of a multiplicity of potential sensing electrodes placed in dermal contact with the portrait subject, said electrodes connected to circuits whose stored electrical energy is altered in a time-dependent manner by dermal contact with the portrait subject; and (d) a microprocessor means in communication with the electrical circuitry of the camera and capable of receiving data from the input circuits and sending an aura image to the light generating means within the camera.

2. A portrait camera with aura recording means according to claim 1, wherein the microprocessor means contains a data base of images in the form of a multidimensional array, said images selectable by pointers created by quantizing the input data received from the multiplicity of input circuits.

3. A portrait camera with aura recording means according to claim 1, including a control panel capable of receiving input information from the operator of said camera, said input information altering or modifying the aura image that is sent by the projector to the film.

4. A portrait camera with aura recording means according to claim 1, including a diffuser plate between the light-generating means of the projector and the image recording means, said diffuser plate able to alter or modify the aura image sent by the light generating means to the film.

5. A portrait camera with aura recording means according to claim 1, including a hologram between the light-generating means of the projector and the film, said hologram able to alter or modify the aura image sent by the light generating means to the image recording means.

6. A portrait camera with aura recording means according to claim 1, including a means for folding the optial axis of the projector, such as a mirror or a lens, so that the distance between the multi-color light source and the image recording means is reduced.

7. A portrait camera with aura recording means according to claim 1, wherein the image recording means is a photographic film.

8. A portrait camera with aura recording means according to claim 1, wherein the image recording means is a video camera containing a digitizing means such as a charge coupled device and a scanning means such as a rotatable mirror.

* * * * *